(12) United States Patent
Kwon et al.

(10) Patent No.: US 8,446,545 B2
(45) Date of Patent: May 21, 2013

(54) BACK LIGHT UNIT AND LIQUID CRYSTAL DISPLAY DEVICE USING THE SAME

(75) Inventors: Kyuoh Kwon, Daejeon (KR); Dongyul Kim, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/325,918

(22) Filed: Dec. 14, 2011

(65) Prior Publication Data

US 2012/0229728 A1   Sep. 13, 2012

(30) Foreign Application Priority Data

Mar. 9, 2011  (KR) .......................... 10-2011-0021008

(51) Int. Cl.
*G02F 1/1335* (2006.01)

(52) U.S. Cl.
USPC ............... 349/61; 349/65; 362/612; 362/630; 362/633

(58) Field of Classification Search
None
See application file for complete search history.

(56) References Cited

U.S. PATENT DOCUMENTS 8,194,208 B2 * 6/2012 Wu et al. .......................... 349/65

* cited by examiner

*Primary Examiner* — Richard Kim
(74) *Attorney, Agent, or Firm* — Brinks Hofer Gilson & Lione

(57) ABSTRACT

There is provided a backlight unit including a cover bottom, at least one pairs of metal boards, each being installed on the cover bottom, having a body part and a bent part bent in one end region of the body part, and including an insulated wire on a surface thereof, at least one LED package mounted on the bent part; and a light guide plate installed at the cover bottom.

10 Claims, 4 Drawing Sheets

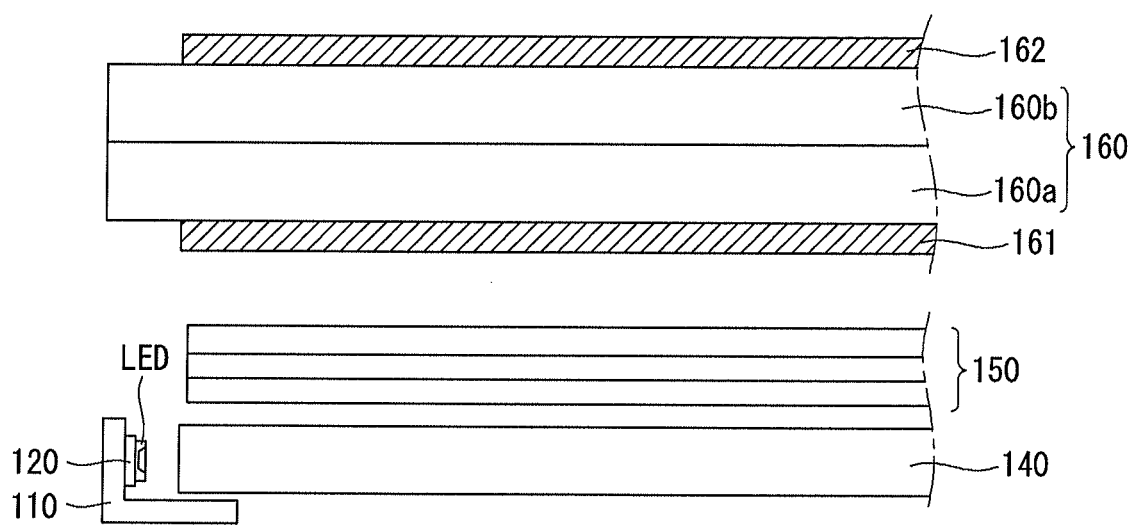

BACK LIGHT UNIT AND LIQUID CRYSTAL DISPLAY DEVICE USING THE SAME

This application claims the benefit of Korean Patent Application No. 10-2011-0021008 filed on Mar. 9, 2011, which is hereby incorporated by reference in its entirety.

BACKGROUND

1. Field

The present disclosure relates to a backlight unit and a liquid crystal display device using the same.

2. Related Art

With the development of information technology, the market of display devices, serving as connection media between users and information, has expanded. This has brought about an increase in the use of flat panel displays (FPD) such as liquid crystal displays (LCD), organic light emitting diodes (OLED), plasma display panels (PDP), and the like. Of the aforementioned display devices, the liquid crystal displays are in widespread use since they can implement high resolution and be configured to have a large size as well as small size.

The liquid crystal display devices are classified into light-receiving type display devices. Such a liquid crystal display device can express an image upon receiving light from a backlight unit located under a liquid crystal panel. The backlight unit may include a light source, an optical film layer, and the like in order to efficiently provide light to the liquid crystal panel. Here, the optical film layer may include a diffusion sheet, a prism sheet, a protective sheet, and the like.

Recently, light emitting diodes (LED) have been in widespread use as a light source in the backlight unit. The LEDs are being used as point light sources configured in a package to constitute a unit light source. An LED package is mounted on a printed circuit board for LEDs and attached to a cover bottom by thermal pads having a heat dissipation function.

However, the related art structure has difficulties in heat dissipation, thus bringing about deterioration in heat dissipation properties, and suffers from cost increases incurred by the use of multiple LED packages. Thus, there is a need to improve such limitations.

SUMMARY

According to an exemplary embodiment of this document, there is provided a backlight unit including a cover bottom; at least one pairs of metal boards, each being installed on the cover bottom, having a body part and a bent part bent in one end region of the body part, and including an insulated wire on a surface thereof; at least one LED package mounted on the bent part; and a light guide plate installed at the cover bottom.

According to an exemplary embodiment of this document, there is provided a liquid crystal display device including a liquid crystal panel; and a backlight unit providing light to the liquid crystal panel, the backlight unit including a cover bottom, at least one pairs of metal boards, each being installed on the cover bottom, having a body part and a bent part bent in one end region of the body part, and including an insulated wire on a surface thereof; at least one LED package mounted on the bent part; and a light guide plate installed at the cover bottom.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

FIG. 6 is a cross-sectional view illustrating part of a liquid crystal display device according to an exemplary embodiment of the present invention.

DETAILED DESCRIPTION OF THE EMBODIMENTS

Reference will now be made in detail embodiments of the invention examples of which are illustrated in the accompanying drawings.

Figure 1:
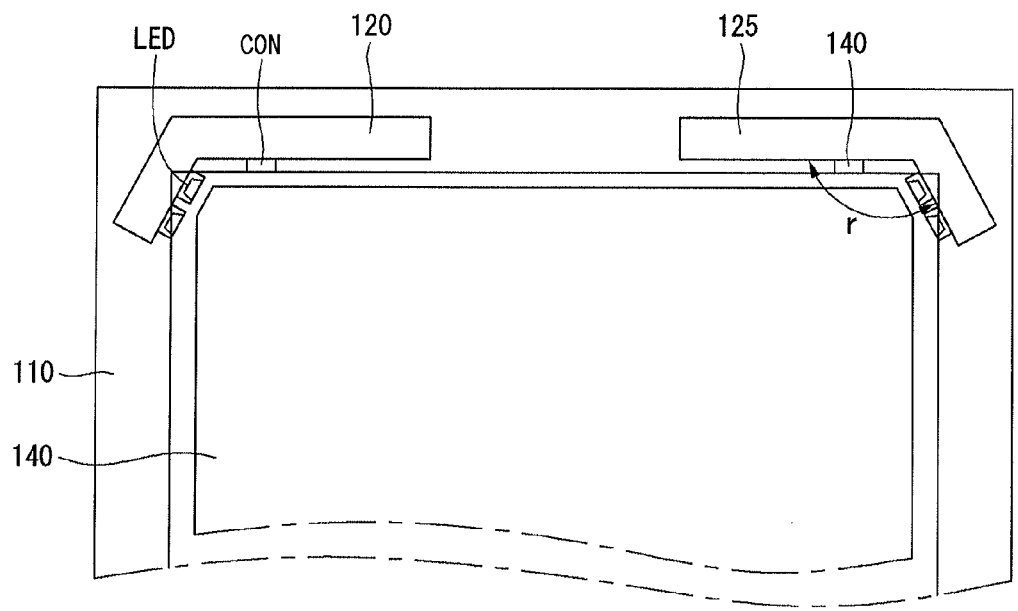
FIG. 1 is a schematic plan view illustrating a backlight unit according to an exemplary embodiment of the present invention.
Figure 2:
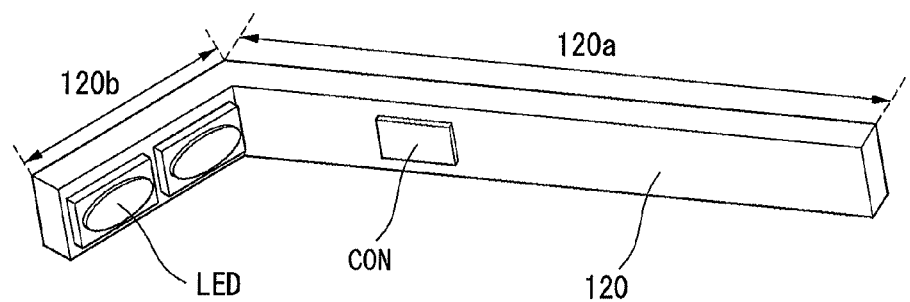
FIG. 2 is a perspective view illustrating a metal board depicted in FIG. 1.
Figure 3:
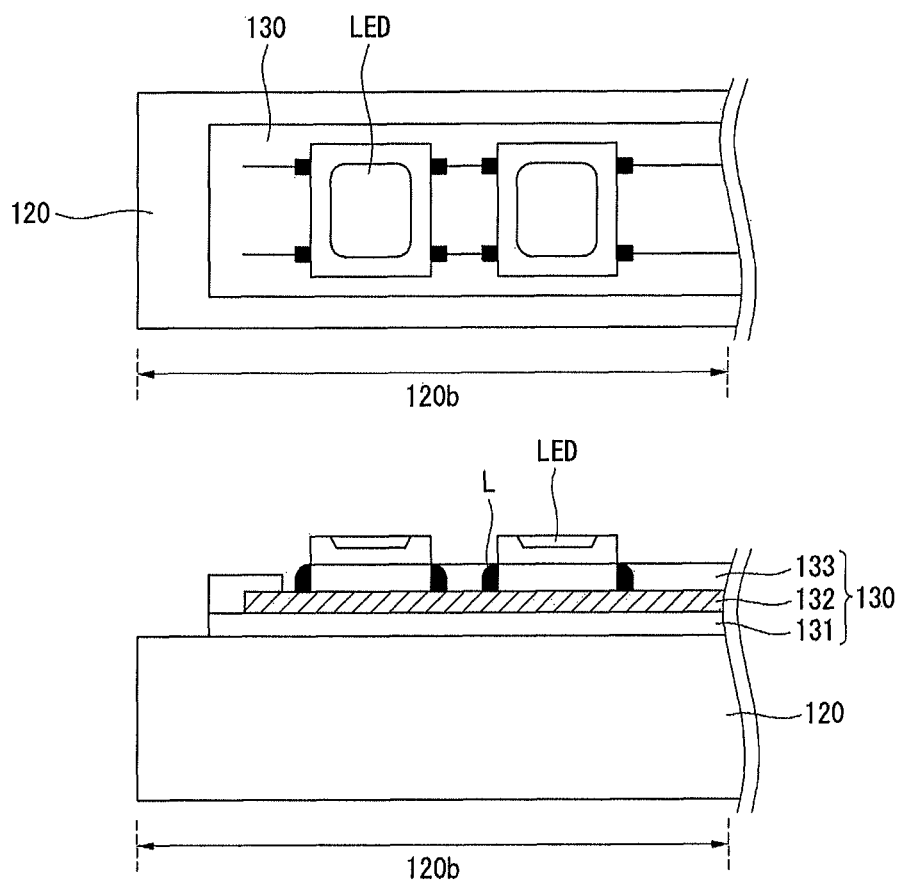
FIG. 3 is a plan view and a cross-sectional view illustrating a bent part of the metal substrate depicted in FIG. 1.
Figure 4:
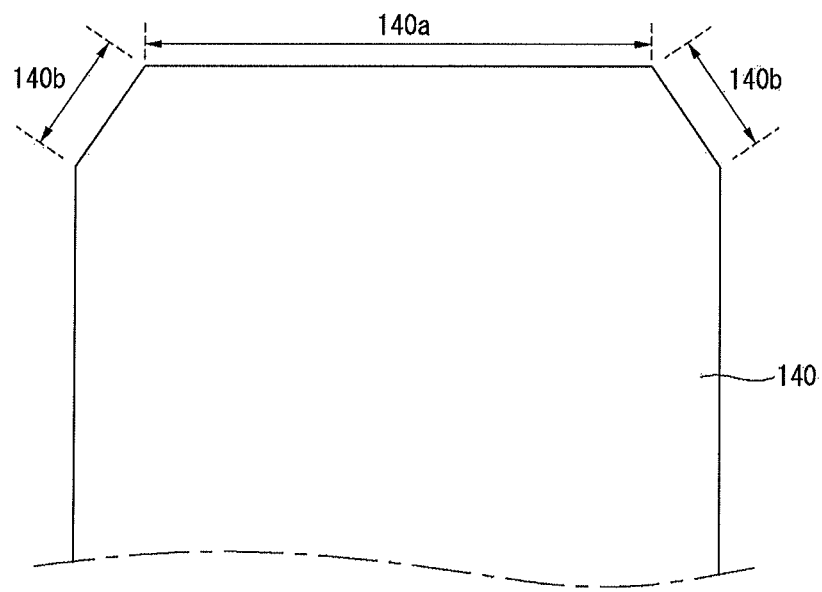
FIG. 4 is a plan view illustrating a light guide plate depicted in FIG. 1.

FIG. 1 is a schematic plan view illustrating a backlight unit according to an exemplary embodiment of the present invention, and FIG. 2 is a perspective view illustrating a metal board depicted in FIG. 1. FIG. 3 is a plan view and a cross-sectional view illustrating the metal board depicted in FIG. 1, and FIG. 4 is a plan view illustrating a light guide plate depicted in FIG. 1.

As shown in FIGS. 1 through 3, a backlight unit according to an exemplary embodiment of the present invention includes a cover bottom 110, at least one pairs of metal boards 120 and 125, an LED package (LED), and a light guide plate 140.

The cover bottom 110 serves to house the one pairs of metal boards 120 and 125, the light guide plate 140, and the like in the backlight unit.

The at least one pairs of metal boards 120 and 125 are installed on the cover bottom 110. Each of the metal boards 120 and 125 has a bent part 120b bent in one end portion of a body part 120 thereof, and includes an insulated wire on the surface thereof. Also, each of the metal boards 120 and 125 has a connector CON on the body part 120a and at least one LED package LED mounted on the bent part 120b. The LED package LED mounted on the bent part 120b emits light by a signal delivered through the connector CON provided on the body part 120a.

The metal boards 120 and 125 may utilize a flexible material, such as a material consisting of aluminum and iron (Al+Fe). Therefore, the surfaces of the metal boards 120 and 125 are configured to include insulated wires as shown in FIG. 3.

An LED mounting region 130 containing the insulated wires is included in one surface of the metal board 120. The LED mounting region 130 includes a first insulating layer 131 formed on one surface of the metal board 120, a wiring layer 132 formed on the first insulating layer 131, and a second insulating layer 133 formed on the wiring layer 132. The first insulating layer 131 is provided for electrical insulation between the metal board 120 and the wiring layer 132 formed on the first insulating layer 131. The wiring layer 132 is formed of a conductive material so as to deliver electrical signals to the LED package LED in the LED mounting region 130. The second insulating layer 133 is formed to expose a portion of the wiring layer 132 such that it is mounted with a lead L of the LED package LED coming into contact with the wiring layer 132. Meanwhile, the structure of the LED mounting region 130 provided on one surface of each of the metal boards 120 and 125 extends up to the body part 120*a* having the connector CON thereon.

The bent part 120*b* is bent toward the light guide plate 140. The bent part 120*b* is at an angle (r) of between about 30° and about 50° with respect to the body part 120*a*. However, when the angle between the bent part 120*b* and the body part 120*a* is at least 41°, dark spots which may be generated in the vicinity of the body part 120*a* are suppressed, and light emitted from the LED package LED can be efficiently transmitted to the light guide plate 140.

In the metal board 120 according to an exemplary embodiment of the present invention, the bent angle can be freely controlled, thus allowing the diffusion angle of light to be controlled. Since the metal board 120 has a bent structure, a top-view type LED package LED may be mounted for use.

The light guide plate 140 is installed inside the cover bottom 110. As shown in FIG. 4, due to the aforementioned structure of the metal board 120, the light guide plate 140 has a corner region 140*b* removed corresponding to the bent angle of the bent part 120*b*. Here, light emitted from the LED package (LED) is made incident through the corner region 140*b* of the light guide plate 140.

Meanwhile, according to an exemplary embodiment of the present invention, the one pairs of metal boards 120 and 125 are located separately at one side and the other side by way of example. However, the one pairs of metal boards 120 and 125 may be configured as one body as will now be described.

Figure 5:
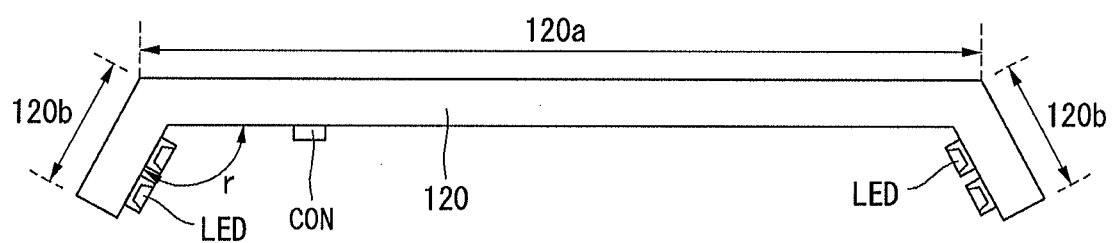
FIG. 5 is a view illustrating a metal board according to another exemplary embodiment of the present invention.

FIG. 5 is a view illustrating a metal board according to another exemplary embodiment of the present invention.

As shown in FIG. 5, the metal board 120 according to another exemplary embodiment of the present invention is configured to have a body part 120*a* and bent parts 120*b* bent in both end portions of the body part 120*a*, respectively.

As in the above embodiment, an LED mounting region including insulated wires is formed on one surface of each of the bent parts 120*b* provided at both end portions of the body part 120*a*. The bent parts 120*b* are each provided with at least one LED package LED, and the body part 120*a* is provided with a connector CON delivering signals to the LED package LED. The LED package LED and the connector CON are electrically connected by the insulated wires formed on the metal board 120.

Meanwhile, in the case where LED packages LED are mounted only on the bent parts 120*b* as in the exemplary embodiments of the present invention described above, the number of LED packages LED is reduced by approximately ¹/₁₀ as compared to the related art. Thus, it is preferable to use LED packages each having the luminous flux that is 10 times greater than in the related art. When luminous flux per LED package LED is increased, more current needs to be applied, and heat dissipation properties become significantly important. For the above reasons, the present invention employs a board of a metallic material to enhance the heat dissipation properties of a printed circuit board on which LED packages are mounted.

A liquid crystal display device including the backlight unit according to the exemplary embodiments described above will now be described.

FIG. 6 is a cross-sectional view illustrating part of the liquid crystal display device according to an exemplary embodiment of the present invention.

As shown in FIG. 6, the liquid crystal display device according to the exemplary embodiment includes a cover bottom 110, a metal board 120 on which an LED package LED is mounted, a light guide plate 140, an optical member 150, and a liquid crystal panel 160.

The liquid crystal panel 160 serves to display an image. The liquid crystal panel includes sub-pixels including a liquid crystal layer formed between a thin film array substrate 160*a* and a color filter substrate 160*b*. The thin film transistor array substrate 160*a* and the color filter substrate 160*b* include switching transistors driven by gate signals supplied from gate lines, storage capacitors storing data voltage supplied from data lines by the switching of the switching transistors, pixel electrodes receiving pixel voltage from the switching transistors, common electrodes receiving common voltage from common voltage lines, liquid crystals driven by an electric field formed by the pixel and common electrodes, color filters converting light emitted by the driving of the liquid crystals into red, green, blue light and the like, a black matrix preventing color mixture between the color filters. The liquid crystal panel 160 may implemented to operate in a Twisted Nematic (TN) mode, a Vertical Alignment (VA) mode, an In Plane Switching (IPS) mode, a Fringe Field Switching (FFS) mode, an Electrically Controlled Birefrigence (ECB) mode, or the like.

A lower polarizing plate 161 and an upper polarizing plate 161, converting polarizing characteristics of light made incident through the backlight unit (110, 120 and 150), are respectively attached to the thin film transistor array substrate 160*a* and the color filter substrate 160*b* constituting the liquid crystal panel 160.

The backlight unit (110, 120, 140, and 150) serves to provide light to the liquid crystal panel 160. The backlight unit (110, 120, 140 and 150) includes the cover bottom 110, the metal board 120, the light guiding plate 140, and the optical member 150.

The cover bottom 110 serves to house the metal board 120, the light guide plate 140, the optical member 150, and the like. As described in the above exemplary embodiments, the cover bottom 110 has a structure in which an LED package LED is mounted on a bent part.

The light guide plate 140 converts a point light source emitted from the LED package LED into a surface light source, and emits the surface light source. In the case of the light guide plate 110, as described above with reference to FIG. 4, the corner regions 140*b* is removed corresponding to the shapes of the body part and the bent part of the metal board 120. Thus, the light guide plate 110 has six faces in a plan view.

The optical member 150 serves to increase efficiency of light emitted through the light guide plate 140. The optical member 150 includes a sheet layer such as a diffusion sheet, a prism sheet (or a lens sheet), a protective sheet, or the like. Also, the optical member 150 may include a reflective sheet reflecting emitted light from under the light guide plate 140.

As set forth above, the present invention provides a backlight unit including a metal board for mounting an LED package, capable of enhancing heat dissipation properties as compared to the related art flexible printed circuit board (FPCB) while allowing for the optional adjustment of a diffusion angle of light from the LED package, and a liquid crystal display device including the backlight unit.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A backlight unit comprising:
   a cover bottom;
   at least one pairs of metal boards, each being installed on the cover bottom and having a body part and a bent part bent in one end region of the body part, the metal boards including an insulated wire on a surface thereof;
   at least one LED package mounted on the bent part; and
   a light guide plate disposed at the cover bottom.

2. The backlight unit of claim 1, wherein the bent part is bent toward the light guide plate.

3. The backlight unit of claim 2, wherein the light guide plate has a corner region removed corresponding to an angle at which the bent part is bent.

4. The backlight unit of claim 1, wherein the metal board include:
   a first insulating layer;
   a wiring layer on the first insulating layer; and
   a second insulating layer on the wiring layer.

5. The backlight unit of claim 1, wherein the bent part is at an angle of between about 30° and about 50° with respect to the body part.

6. A liquid crystal display device comprising:
   a liquid crystal panel; and
   a backlight unit providing light to the liquid crystal panel, the backlight unit including a cover bottom, at least one pairs of metal boards, each being installed on the cover bottom and having a body part and a bent part bent in one end region of the body part, the metal boards including an insulated wire on a surface thereof; at least one LED package mounted on the bent part; and a light guide plate disposed at the cover bottom.

7. The liquid crystal display device of claim 6, wherein the bent part is bent toward the light guide plate.

8. The liquid crystal display device of claim 7, wherein the light guide plate has a corner region removed corresponding to an angle at which the bent part is bent.

9. The liquid crystal display device of claim 6, wherein the metal boards includes:
   a first insulating layer;
   a wiring layer on the first insulating layer; and
   a second insulating layer on the wiring layer.

10. The liquid crystal display device of claim 6, wherein the bent part is at an angle of between about 30° and about 50° with respect to the body part.

* * * * *